US012117254B2

(12) United States Patent
Dwight et al.

(10) Patent No.: US 12,117,254 B2
(45) Date of Patent: *Oct. 15, 2024

(54) APPARATUS AND METHOD FOR CLEANING HVAC COOLING COILS

(71) Applicant: Coil Flow Max, Inc., Sumter, SC (US)

(72) Inventors: Arthur J. Dwight, Sumter, SC (US); Rudolph Singleton, Sumter, SC (US)

(73) Assignee: Coil Flow Max, Inc., Sumter, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,667

(22) Filed: Sep. 13, 2023

(65) Prior Publication Data
US 2023/0417498 A1 Dec. 28, 2023

Related U.S. Application Data

(60) Continuation of application No. 17/954,727, filed on Sep. 28, 2022, now Pat. No. 11,788,807, which is a
(Continued)

(51) Int. Cl.
F28G 1/16 (2006.01)
B01D 21/26 (2006.01)
(Continued)

(52) U.S. Cl.
CPC ........... *F28G 1/166* (2013.01); *B01D 21/267* (2013.01); *B08B 3/024* (2013.01); *B08B 3/14* (2013.01);
(Continued)

(58) Field of Classification Search
CPC ..... F28G 1/166; F28G 2015/006; B08B 3/02; B08B 3/024
See application file for complete search history.

(56) References Cited

U.S. PATENT DOCUMENTS 4,141,754 A 2/1979 Frauenfeld
4,466,155 A 8/1984 Grave
(Continued)

FOREIGN PATENT DOCUMENTS

DE 19725631 C1 3/1999
DE 19812091 A1 * 1/2000 ........... B05B 9/0816
(Continued)

OTHER PUBLICATIONS

Machine translation: DE19812091 (Year: 2000).*
(Continued)

*Primary Examiner* — Natasha N Campbell
(74) *Attorney, Agent, or Firm* — Nelson Mullins Riley & Scarborough LLP

(57) ABSTRACT

An apparatus for cleaning an HVAC coil unit comprises a supply and collection assembly with a housing defining an interior space for containing a quantity of cleaning solution. A pump has an inlet positioned to be in fluid communication with the cleaning solution and is operative to deliver the cleaning solution to an outlet of the supply and collection assembly in a volume of at least 40 gallons per minute. Fluid return piping defines a conduit to conduct used cleaning solution from the HVAC coil unit back to a collection inlet. A filter assembly is positioned along the fluid return piping to filter the used cleaning solution. A fluid flow device is operative to provide pressure to move a quantity of the used cleaning solution through the fluid return piping. The used cleaning solution is returned to the interior space through the collection inlet during operation of said fluid flow device.

21 Claims, 16 Drawing Sheets

Related U.S. Application Data division of application No. 16/745,253, filed on Jan. 16, 2020, now Pat. No. 11,486,663, which is a continuation of application No. 15/392,885, filed on Dec. 28, 2016, now Pat. No. 10,539,381.

(60) Provisional application No. 62/340,277, filed on May 23, 2016, provisional application No. 62/280,970, filed on Jan. 20, 2016, provisional application No. 62/271,839, filed on Dec. 28, 2015.

(51) Int. Cl.
*B08B 3/02* (2006.01)
*B08B 3/14* (2006.01)
*B08B 17/02* (2006.01)
*F28G 9/00* (2006.01)
*F28G 15/00* (2006.01)

(52) U.S. Cl.
CPC .............. *B08B 17/025* (2013.01); *F28G 9/00* (2013.01); *F28G 15/003* (2013.01); *F28G 2015/006* (2013.01)

(56) References Cited

U.S. PATENT DOCUMENTS

| | | |
|---|---|---|
| 4,820,496 A | 4/1989 | Sapoff |
| 5,134,748 A | 8/1992 | Lynn |
| 5,485,961 A | 1/1996 | Reitzig |
| 7,841,351 B1 * | 11/2010 | Kane ................... A01M 7/0046 239/154 |
| 10,539,381 B2 | 1/2020 | Dwight et al. |
| 11,486,663 B2 | 11/2022 | Dwight et al. |
| 11,788,807 B2 | 10/2023 | Dwight et al. |
| 2002/0170704 A1 | 11/2002 | Jackson |
| 2008/0092924 A1 | 4/2008 | Collin et al. |
| 2010/0025497 A1 | 2/2010 | Ellenbecker |
| 2012/0260948 A1 | 10/2012 | Balas et al. |
| 2015/0129171 A1 | 5/2015 | Kipp |
| 2015/0144303 A1 | 5/2015 | Burfeind |
| 2015/0211819 A1 | 7/2015 | Lindstrom et al. |
| 2023/0016318 A1 | 1/2023 | Dwight et al. |

FOREIGN PATENT DOCUMENTS

| | | |
|---|---|---|
| DE | 10202406 A1 | 8/2003 |
| DE | 102005030633 A1 | 1/2007 |
| EP | 1508764 A2 | 2/2005 |
| JP | 03164696 A | 7/1991 |
| JP | 04306496 A | 10/1992 |
| JP | 051897 A | 1/1993 |
| WO | 2002039047 A1 | 5/2002 |
| WO | 2007063452 A3 | 12/2007 |
| WO | 2012072897 A1 | 6/2012 |

OTHER PUBLICATIONS

International Search Report and Written Opinion dated Mar. 10, 2017 in international application No. PCT/US2016/068948, all enclosed pages cited.

* cited by examiner

APPARATUS AND METHOD FOR CLEANING HVAC COOLING COILS

CROSS-REFERENCE TO RELATED APPLICATIONS

This application is a continuation of co-pending application Ser. No. 17/954,727, filed Sep. 28, 2022, which is a division of application Ser. No. 16/745,253, filed Jan. 16, 2020, now U.S. Pat. No. 11,486,663, which is a continuation of application Ser. No. 15/392,885, filed Dec. 28, 2016, now U.S. Pat. No. 10,539,381, which is based upon and claims the benefit of the following provisional applications: Ser. No. 62/271,839, filed Dec. 28, 2015; Ser. No. 62/280,970, filed Jan. 20, 2016; and Ser. No. 62/340,277, filed May 23, 2016. Each of the foregoing applications is incorporated herein by reference in its entirety for all purposes.

BACKGROUND OF THE INVENTION

The present invention relates to HVAC (heating, ventilation, and air conditioning) systems, particularly those having cooling coils with closely spaced and deep fin arrangements. More particularly, the present invention relates to a novel apparatus and method for cleaning HVAC cooling coils.

HVAC cooling coils are designed to cool air by removing water or water vapor from the air passing across the coils. If the air passing across the coils contains any contamination, the contamination will build up between the thin, closely aligned fins of the coils. (The fins may typically be made of aluminum but they can be copper, stainless steel, or other suitable material.) As this contamination builds up, several harmful things begin to happen. The contamination build-up starts insulating the fins which progressively lowers the thermodynamic heat transfer properties of the entire system. The space between the coils also becomes narrower thereby restricting airflow in the system. This restricted airflow builds pressure in the HVAC system and forces the fan motor to work harder and/or reduces the output of air to the air conditioned spaces fed by the HVAC system. At some point, the buildup of contamination can make the HVAC system not function properly or at all. In a chilled water system, contamination buildup reduces the coil's ability to transfer heat, so the chiller that supplies the hot or cold water has to work harder, thus using more energy. In a DX HVAC system, partially contaminated coils create an increased head pressure on the compressor, making it run at an elevated temperature, which greatly reduces the life of the compressor. The compressor is often the most expensive component in an HVAC system.

Contamination build-up on HVAC system coils can result in the introduction and growth of microbiological organisms (microbials) such as bacteria and fungi (mold). Microbials are ubiquitous in the environment and are brought into the HVAC system through fresh air or make-up air intakes of the system. The microbials in the air are captured in the coils and are introduced into a moist environment with nutrients from built-up contaminants. Since the coils stay moist for long periods of time, the mold and bacteria are allowed to grow. This buildup of microbial growth in coils is commonly referred to as biofilm. When the temperature coming into the system is hot or warm, biofilm growth can take place rapidly. As coils dry out the mold and bacteria can be released into the air in the occupied building through the HVAC duct systems downstream of the coils. Microbials can cause serious health issues to building occupants. Health care facilities are at risk from these airborne microbials due to immunocompromised patients being treated in their buildings.

HVAC coils are supposed to be cleaned routinely to prevent and/or remove contamination build-up that causes the problems outlined above. If cleaning completely removes all contamination without damaging the fins of the coils and the HVAC ductwork also remains clean and dry, the HVAC system would continue to perform as designed without introducing microbials into the building.

The typical procedure for cleaning HVAC coils is to use a pump-up sprayer to apply coil cleaner solution to the upstream and downstream faces of the coil. The cleaner is allowed to stay on the coil for the amount of time recommended by the coil cleaner manufacturer. A garden hose or low pressure sprayer is then used to rinse the coils to remove contaminants from the cooling coil, as well as the coil cleaning chemicals.

Thus, conventional coil cleaning procedures use a garden hose supplying approximately 5-9 gallons per minute flow rate to flush the coil. For thick coils (normally 4" or greater), or closely spaced coil fins (more than 10 fins per inch), such flow rates can only physically reach a few inches into the cooling coil. Generally, when a thick coil (e.g., eight inches thick or more) is cut so that its cross-section can be inspected, the center of the coil is still impacted with contaminants that the conventional coil cleaning process cannot reach.

The present invention recognizes the foregoing considerations, and others, of the prior art.

SUMMARY OF THE INVENTION

The present invention provides a novel apparatus and method for cleaning HVAC cooling coils to remove contaminants that have built up between the fins of the cooling coils. Preferred embodiments use a higher velocity flow of cleaning solution augmented with a flow of air (or other suitable gas) to remove contaminants that cannot be removed with conventional coil cleaning systems and procedures. An apparatus and method in accordance with this invention will generally reach much deeper into the coil and substantially completely remove the buildup. Preferably, the cleaning solution is continuously removed as it collects in a drain basin under the coils for use in enclosed spaces and to facilitate cleanup.

One aspect of the present invention provides an apparatus for cleaning HVAC cooling coils. The apparatus comprises a supply and collection assembly having a housing defining an interior space for containing a quantity of cleaning solution. A pump is also provided, having a pump inlet positioned to be in fluid communication with the cleaning solution. The pump is operative to deliver the cleaning solution to a supply outlet of the supply and collection assembly. A vacuum source has a vacuum inlet positioned to be in fluid communication with an ullage space such that the vacuum source creates negative pressure in the ullage space during operation. A collection inlet is in fluid communication with the ullage space such that the cleaning solution is returned to the interior space through the collection inlet during operation of the vacuum source.

Preferred embodiments of the apparatus further comprise a nozzle device in fluid communication with the supply outlet via outlet piping which is configured to deliver the cleaning solution to a surface of an HVAC coil unit. Embodiments may also preferably include a fluid return tool in fluid communication with the collection inlet via return piping, the fluid return tool being configured to collect used cleaning solution from the HVAC coil unit. Preferably, a filter assembly may be positioned along the return piping between the fluid return tool and the collection inlet.

For example, the filter assembly may comprise a hydrocyclonic filter. In some such embodiments, an electrically-controlled flush valve may be provided in fluid communication with a collection container of the hydrocyclonic filter. Control circuitry operative to open and close the flush valve so as to empty the collection container may also be provided.

Many embodiments of the apparatus may further comprise air supply piping configured to introduce compressed air into the cleaning solution being delivered from the supply outlet. An electrically controlled valve may be situated in the air supply piping, the valve being operative to pulsate introduction of the air into the cleaning solution at a predetermined frequency.

According to some preferred embodiments, upper and lower level switches may be provided in the interior space of the housing. The upper level switch is preferably operative to cut off power to the pump if a threshold upper level of the cleaning solution is reached. The lower level switch is preferably operative to open a fresh water supply port if a threshold lower level of the cleaning solution is reached. The pump may be located entirely within the housing of the supply and collection assembly. The vacuum source may comprises a motor located external to the housing of the supply and collection assembly.

Another aspect of the present invention provides an apparatus for cleaning HVAC cooling coils. The apparatus comprises a supply and collection assembly having a housing defining an interior space for containing a quantity of cleaning solution. A pump is operative to deliver the cleaning solution to a supply outlet of the supply and collection assembly. A vacuum source is also provided having a vacuum inlet positioned to be in fluid communication with an ullage space such that the vacuum source creates negative pressure in the ullage space during operation to return the cleaning solution through a collection inlet.

The apparatus of this aspect further has a nozzle device in fluid communication with the supply outlet via outlet piping, the nozzle device being configured to deliver the cleaning solution to a surface of an HVAC coil unit. A fluid return tool is in fluid communication with the collection inlet via return piping, the fluid return tool being configured to collect used cleaning solution from the HVAC coil unit. A filter assembly is in line with the return piping between the fluid return tool and the collection inlet.

According to some preferred embodiments, the nozzle device comprises a delivery face having a substantially planar surface for juxtaposition on the surface of the HVAC coil unit, a plurality of apertures being defined in the delivery face for passage of the cleaning solution. Preferably, the apertures may be oriented at a predetermined angle relative to the substantially planar surface of the delivery face. In some embodiments, this predetermined angle may fall within a range of approximately 45 degrees to approximately 53 degrees.

A still further aspect of the present invention provides a method of cleaning an HVAC coil unit located above a drain basin. One step of the method involves providing a supply and collection assembly having a reservoir containing liquid cleaning solution, a pump operative to output the liquid cleaning solution through a supply outlet, and a vacuum source operative to draw in used liquid cleaning solution through a collection inlet. According to another step, a nozzle device in fluid communication with the supply outlet is also provided, the nozzle device having a delivery face. A further step involves providing a fluid return tool in fluid communication with the collection inlet, and positioning the fluid return tool in the drain basin. According to a further step, the delivery face of the nozzle device is moved across a surface of the HVAC coil unit to deliver the cleaning solution into areas between fins thereof.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
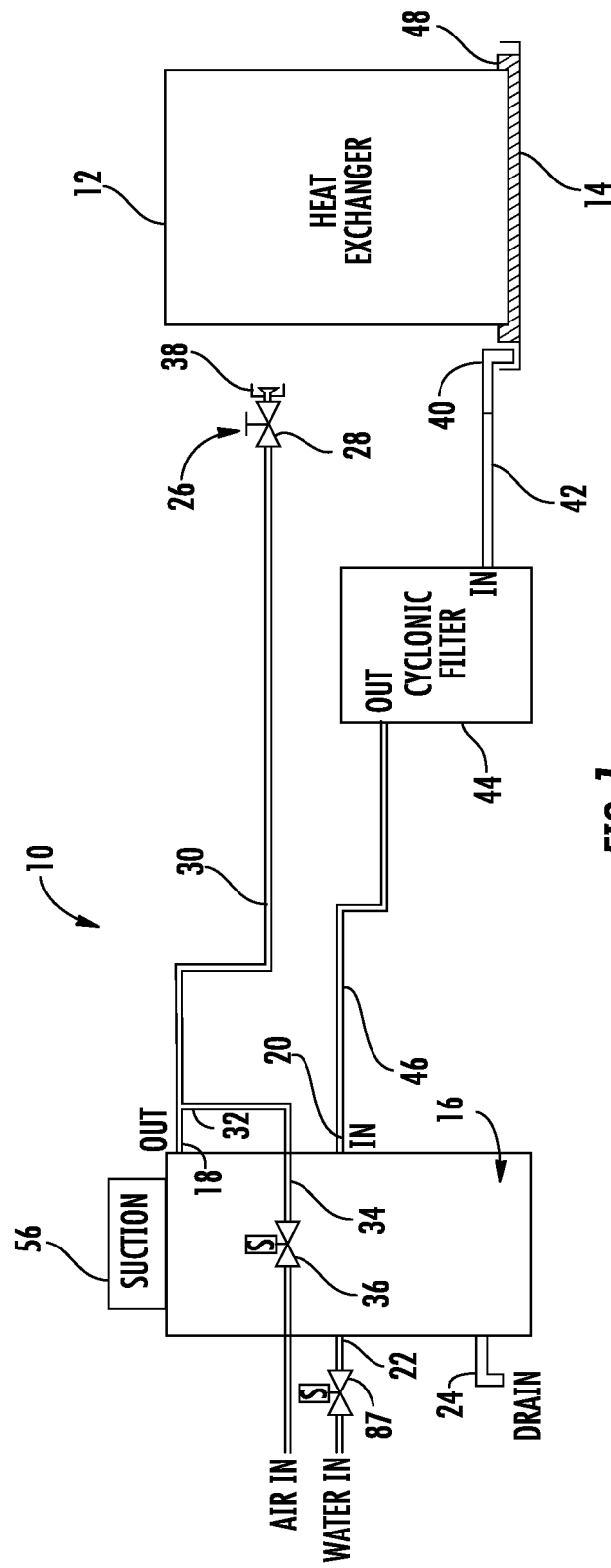
FIG. 1 is a diagrammatic representation of an HVAC cooling coil cleaning apparatus in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates an exemplary apparatus 10 in accordance with an embodiment of the present invention for cleaning an HVAC coil unit 12 (labeled "heat exchanger"). As noted above, coil unit 12 may have a large number of closely-spaced fins (e.g., at least 10 fins per inch) between which various contaminants will collect. Due to the depth of coil unit 12 (e.g., at least four inches), conventional cleaning techniques have often been ineffective to clean the entire fin structure. A conventional drain pan 14 is located below coil unit 12, as shown.

Apparatus 10 includes a supply and collection assembly 16, preferably in the form of an integrated unit (which may resemble, for example, a barrel). Supply and collection assembly 16, which will be referred to herein as "main assembly 16," contains a quantity of cleaning solution that is supplied to and collected from coil unit 12 during the cleaning process. In this regard, main assembly 16 defines an internal space in which the cleaning solution is contained. The cleaning solution itself may preferably comprise a mixture of fresh water and one or more suitable cleaning agents, such as detergents.

As will be explained, the cleaning solution is supplied via an outlet 18 (labeled "OUT") to clean the fins of coil unit 12. Recirculated solution is drawn back into main assembly 16 via a return inlet 20 (labeled "IN"). Fresh water is added to main assembly 16 (at the beginning of the cleaning process or as water is lost during the cleaning process) via a water supply inlet 22 (labeled "WATER IN"). The water supply inlet, for example, may comprise a common hose fitting to which a flexible hose can be attached to connect it to a common water supply spigot. A drain 24 is provided, preferably near the bottom of main assembly 16, for removal of used cleaning solution at the conclusion of the cleaning process.

A nozzle device 26 is used to apply the cleaning solution under pressure to at least one of (and preferably both of) the front and back surfaces of coil unit 12. For example, the cleaning solution may be applied in a slow sweeping motion across the surface of coil unit 12. (In many cases, this sweeping motion will be done manually by an operator, although embodiments are contemplated in which a robotic mechanism may be employed to move nozzle 26 in an automated fashion.) The sweeping motion may preferably be horizontal, starting at the top of the coil unit's surface and proceeding to the bottom in successive courses. Cleaning solution and the material that it removes from the fins will flow into the drain pan 14 for collection. Nozzle device 26 preferably has a manual valve 28 associated therewith that the operator can close to stop flow of cleaning solution as necessary or desired.

As can be seen, nozzle device 26 is in fluid communication with outlet 18 via suitable piping, at least some of which will take the form of a flexible hose 30 allowing movement of nozzle device 26 as described. In addition, a supply of compressed air is preferably combined with the cleaning solution at piping junction 32, as shown. In this regard, the air supply conduit 34 preferably has a valve 36 which can be used to interrupt the supply of air. Preferably, valve 36 may take the form of a solenoid-controlled valve under the operation of the control circuitry of main assembly 16. The compressed air may be provided by a common air compressor, or the facility in which coil unit 12 is located may have an integrated compressed air supply.

In order to most effectively clean coil unit 12, apparatus 10 will deliver a relatively large quantity of cleaning solution during the cleaning process. For example, some embodiments will provide between 40-70 gallons of liquid per minute through a 1.5-inch inner diameter (ID) hose at approximately 40-80 psi of pressure. The compressed air, which may typically be between 80 and 120 psi, is injected into the cleaning solution stream via operation of valve 36. Preferably, valve 36 may alternately open and close, so that the compressed air will be introduced in a pulsating manner. For example, valve 36 may operate at a pulse rate of between 0 Hz and 36 Hz in some presently preferred embodiments. A nominal pulse rate of approximately 22.7 Hz may be especially desirable in some cases. A pulsating valve may also be located just downstream of piping junction 32 to further pulsate the combination of cleaning solution and injected air.

As shown, nozzle device 26 may be equipped with a deflector shield 38 installed around its fluid outlet to keep the cleaning fluid from getting splashed onto the operator. In addition, deflector shield 38 will desirably redirect "splash" water reflected off the coil unit's surface back onto and into the space between the fins. Specifically, deflector shield 38 may create a positive pressure in the area between the shield and the coils which helps direct the cleaning liquid into the coils, increasing the energy available to remove particles from the area between the coils. Preferably, deflector shield 38 will be flexible and have the ability to slide across the fins' surface (i.e., the surface formed by the ends of the fins) without damaging them. For example, the deflector shield may be formed of a suitable plastic material such as polypropylene. While the deflector shield in the diagrammatic representation of FIG. 1 is shown having flanges above and below the nozzle, one skilled in the art will appreciate that typically the flange would be a continuous structure extending all the way around the nozzle to minimize escape of the cleaning fluid.

The recirculated cleaning solution is returned to main assembly 16 from drain pan 14, as noted above. In normal use, drain pan 14 is capable of handling a relatively small amount of condensate (e.g., 1 gpm or less). Thus, main assembly 16 provides substantial suction to remove the cleaning solution as it accumulates in drain pan 14. In this regard, a suction nozzle, referred to herein as "fluid return tool" 40, may be placed in drain pan 14 to facilitate removal of the cleaning solution. Fluid return tool 40 may be attached to one end of a flexible hose 42, the other end of which is attached to the inlet port of a suitable filter assembly 44. The outlet port of filter assembly 44 is in fluid communication with collection inlet 20 via suitable piping 46 (e.g., a flexible hose).

Preferably, filter assembly 44 is configured to remove particulate in the cleaning solution. As will be explained more fully below, filter assembly 44 may take the form of a hydrocyclonic filter that separates particulate from liquid through centrifugal action. Material removed in this manner collects in a container from which it can be removed manually, or automatically through a flushing process. In the illustrated embodiment, a prefilter (i.e., a gross filter) may optionally be provided to remove larger particulates. For example, the prefilter may comprise a filter media 48 (e.g., polyester roll media) placed manually around the base of coil unit 12 before the cleaning process is begun.

Figure 2:
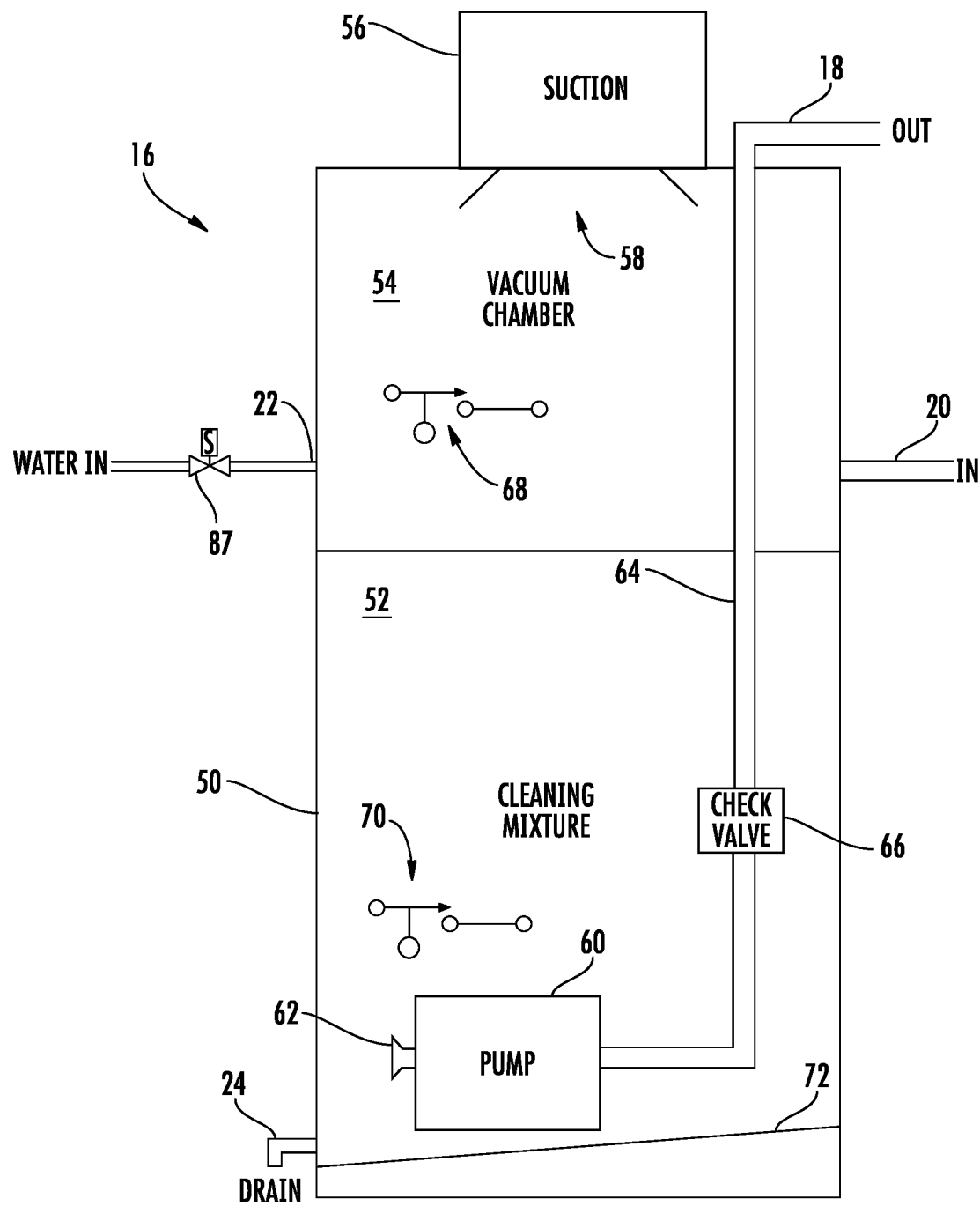
FIG. 2 is a diagrammatic representation showing internal components of the supply and collection assembly of FIG. 1.

Referring now to FIG. 2, additional details of main assembly 16 can be most easily explained. As shown, main assembly 16 comprises a housing 50 defining an interior space. The interior space is partially filled with a cleaning solution 52 ("cleaning mixture") such that an ullage 54 exists above the upper surface of cleaning solution 52. During operation, a vacuum source 56 creates negative pressure in the ullage 54 (which is thus referred to as a "vacuum chamber") to return used cleaning solution back into housing 50 through collection inlet 20. In this case, for example, vacuum source 56 has an air inlet 58 in fluid communication with the ullage 54. Air is thus drawn by vacuum source 56 from the interior space and exhausted to ambient. The size and power of vacuum source 56 determines the rate at which cleaning solution is returned to the housing 50. One skilled in the art will be able to determine the appropriate vacuum source 56 to use in a particular application, depending on various factors. It will be appreciated that the motor/blower components of a wet-dry vacuum (which are widely available) can be used for vacuum source 56. For example, vacuum source 56 may comprise a NIKRO model no. DP55110.

Cleaning solution is pumped through outlet 18 by a pump, which in this case comprises a submersible pump 60 located adjacent the bottom of the interior space of housing 50. The cleaning solution is drawn into pump 60 through an inlet 62 located below the lowest permitted level of cleaning solution. The cleaning solution is then pushed by pump 60 into piping 64, which is in fluid communication with outlet 18. A suitable check valve 66 is positioned along piping 64 to prevent back flow into pump 60. As shown, outlet 18 is located at the top of housing 50 in this case.

Thus, cleaning solution 52 is continuously pumped during operation through outlet 18 and returned into housing 50 through inlet 20. Although some cleaning solution is inevitably lost at coil unit 12, a general equilibrium is achieved by this recirculation process. Nevertheless, the level (i.e., amount) of cleaning solution in housing 50 should remain between certain thresholds in order to prevent damage to vacuum source 56 and/or pump 60, or to otherwise ensure proper operation of main assembly 16. In this regard, upper and lower float switches 68 and 70 are preferably located in the interior space of housing 50. Although different logical arrangements are contemplated, float switch 68 in this case moves away from its contact when the level of cleaning solution rises to an upper threshold. The control circuitry responds by discontinuing the operation of pump 60 (and optionally vacuum source 56) until corrective action can be taken. (In addition, as one skilled in the art will appreciate, vacuum source 56 may have its own integrated float switch.) Float switch 70 makes contact when the level of cleaning solution drops to a lower threshold, which opens a water valve to allow introduction of additional fresh water.

At the conclusion of the cleaning operation, the used cleaning solution is drained from housing 50 via drain 24, which may take the form of a common spigot or the like. For example, the cleaning solution may be allowed to flow into a floor drain or may be collected into suitable vessels for subsequent disposal. As shown, drain 24 is preferably located just above the lowest portion of a sloped floor 72 inside the interior space of housing 50. Once the cleaning solution is drained, housing 50 may be refilled to an operating level with clean water. At that point, the same system may be used to perform a final rinse of the coils with clean water to remove any residual chemicals or contaminants still in the coils.

Figure 3:
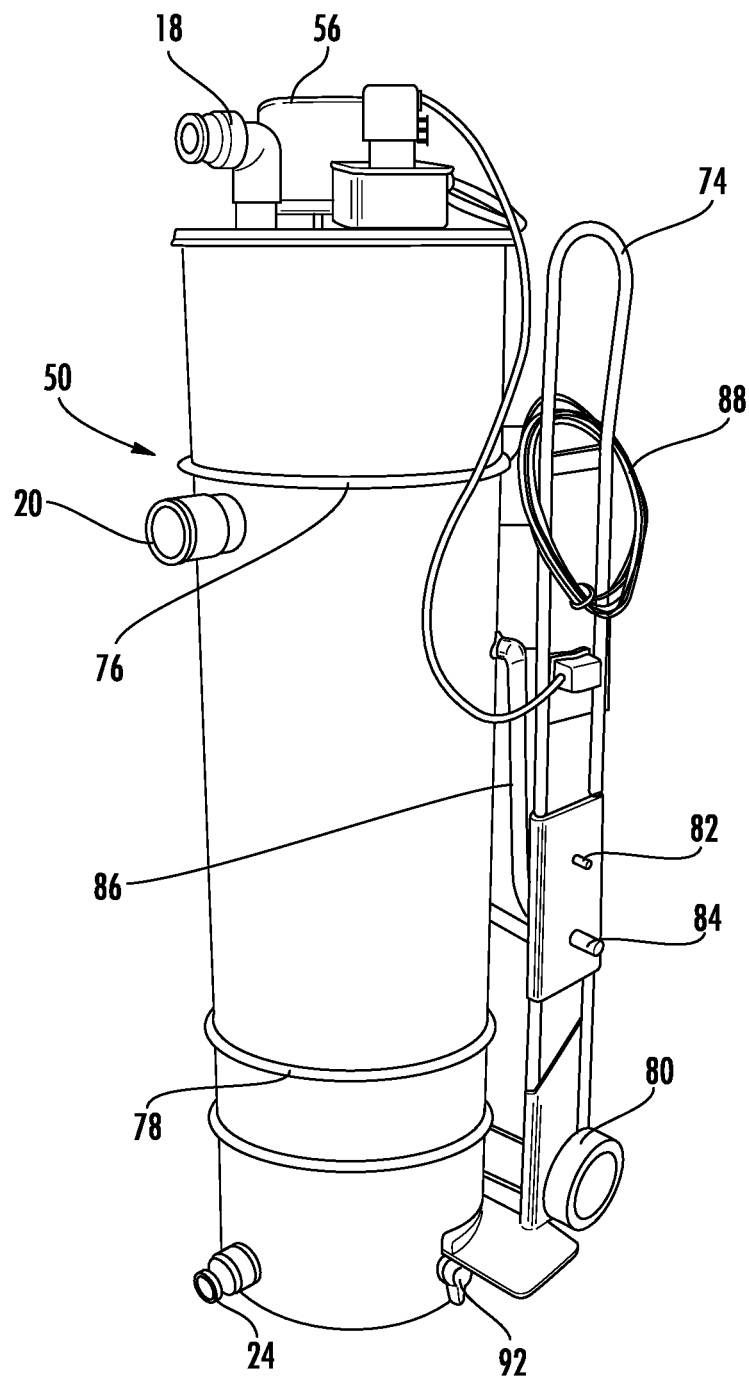
FIGS. 3-5 are perspective views of an exemplary supply and collection assembly in accordance with an embodiment of the present invention.
Figure 4:
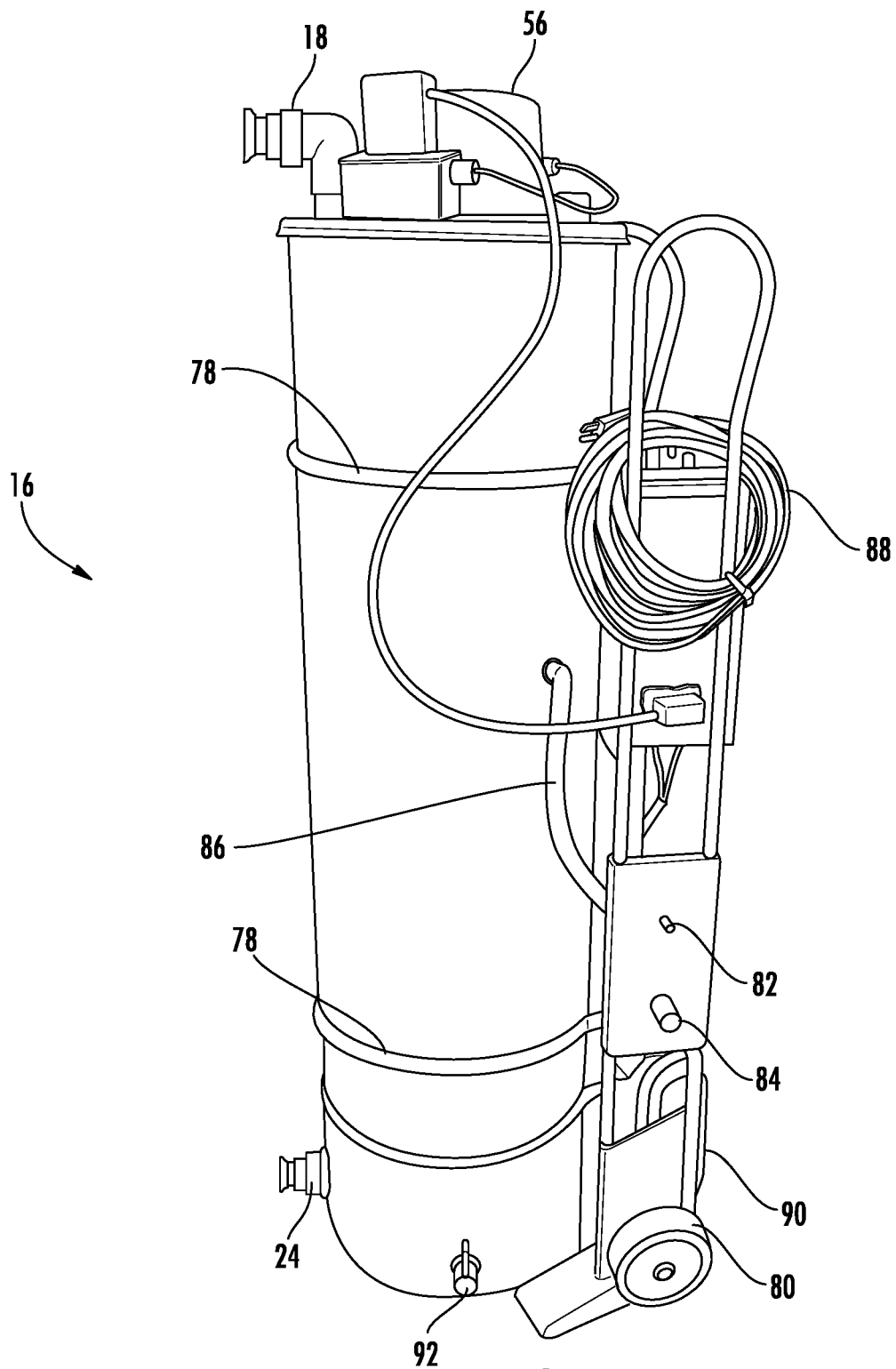
Figure 5:
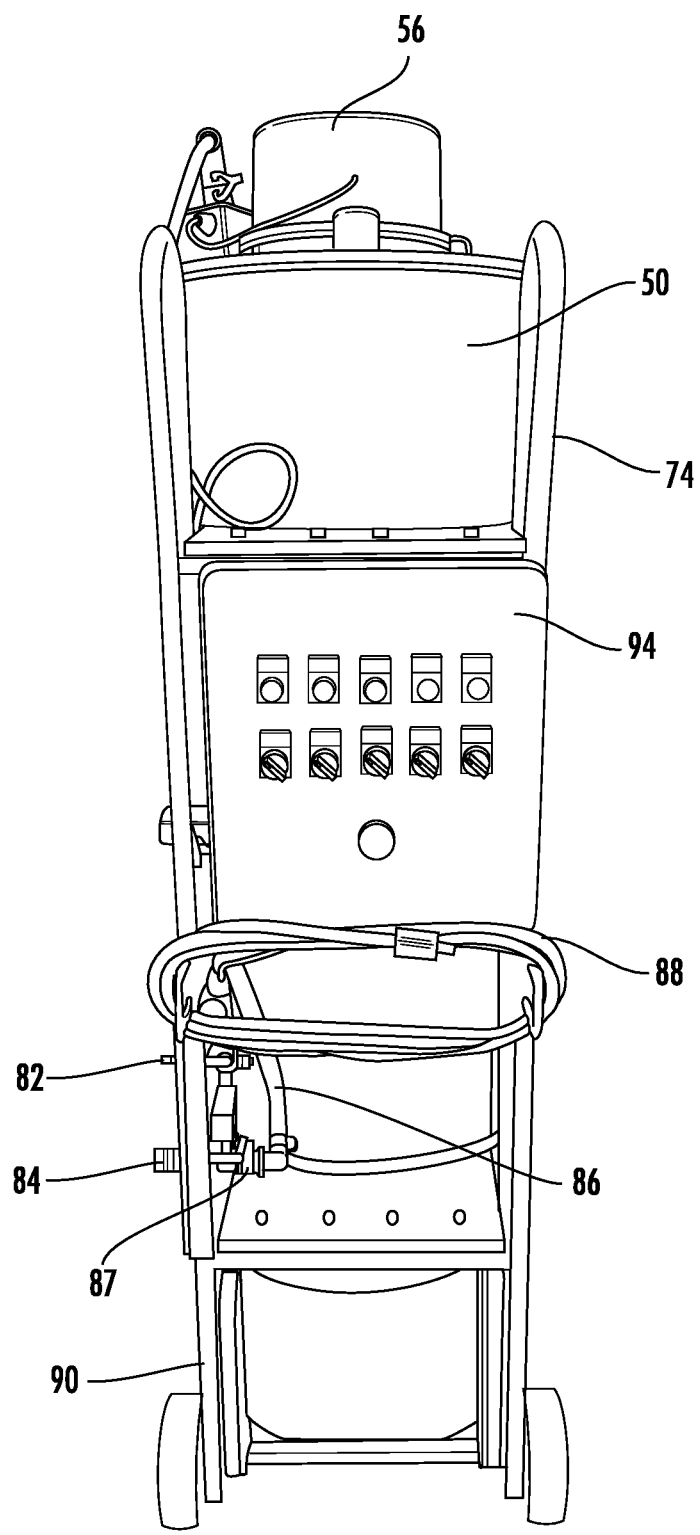

Referring now to FIGS. 3 and 4, main assembly 16 is preferably configured to facilitate its movement from place to place. For example, housing 50 may in one preferred embodiment be attached to a standard hand truck 74, such as by retaining bands 76 and 78. Hand truck 74 has a pair of wheels, such as wheel 80, by which main assembly 16 may be easily moved into position near a coil unit to be cleaned. Hand truck 74 also provides a platform for mounting of other aspects of main assembly 16, such as the respective ports 82 and 84 (which may be suitable quick-connect ports) to which compressed air and fresh water connections are made. Also shown is the conduit 86 through which water flows into the housing 50 from the port 84 when flow is permitted by a solenoid valve 87 (FIG. 1). In addition, as shown in FIG. 5, cord wraps may be mounted to hand truck 74 for storage of power cord 88. Hand truck 74 may also include a stair climber 90 (FIG. 4) to facilitate moving main assembly 16 up a flight of stairs. In this embodiment, the manual valve 92 for drain 24 is located one quarter turn around the circumference of housing 50, as shown, in order to make it more accessible to the operator.

Figure 5A:
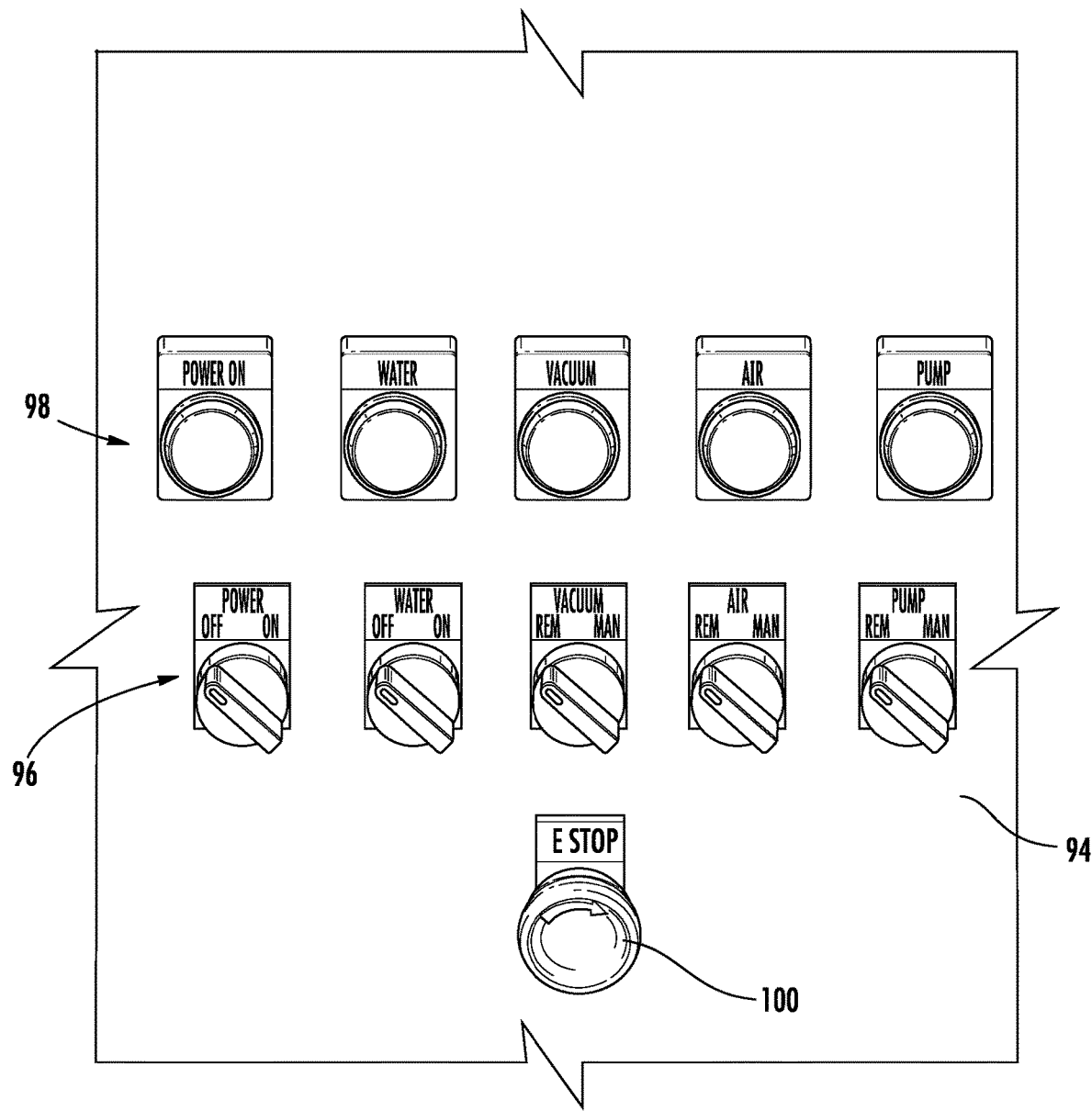
FIG. 5A is an enlarged perspective view of the control panel shown in FIG. 5.

As shown in FIG. 5, the space between the upright handles of hand truck 74 conveniently mounts a panel box 94 in which the control circuitry of main assembly 16 is located. External power is provided to the circuitry by power cord 88, and distributed to the various components of main assembly 16 (including vacuum source 56 and pump 60) by the circuitry. Referring now to FIG. 5A, it can be seen that panel box 94 in this embodiment has five switches (collectively 96) that can be turned to one of two positions. In this regard, power and water switches can be set to either "OFF" or "ON" positions. Vacuum, air and pump switches can be set to either "REM" or "MAN" positions. When set to "MAN," these switches bypass relays that are otherwise controlled by a wireless unit (e.g., a key fob) carried by the operator. When set to "REM," these switches allow control of the relays and their associated circuits by the wireless unit. Each of the switches has an associated light (collectively 98), which illuminates when the circuit associated with the respective switch is energized. An emergency stop button 100 cuts all power to main assembly 16 when it is depressed by the operator.

Figure 6A:
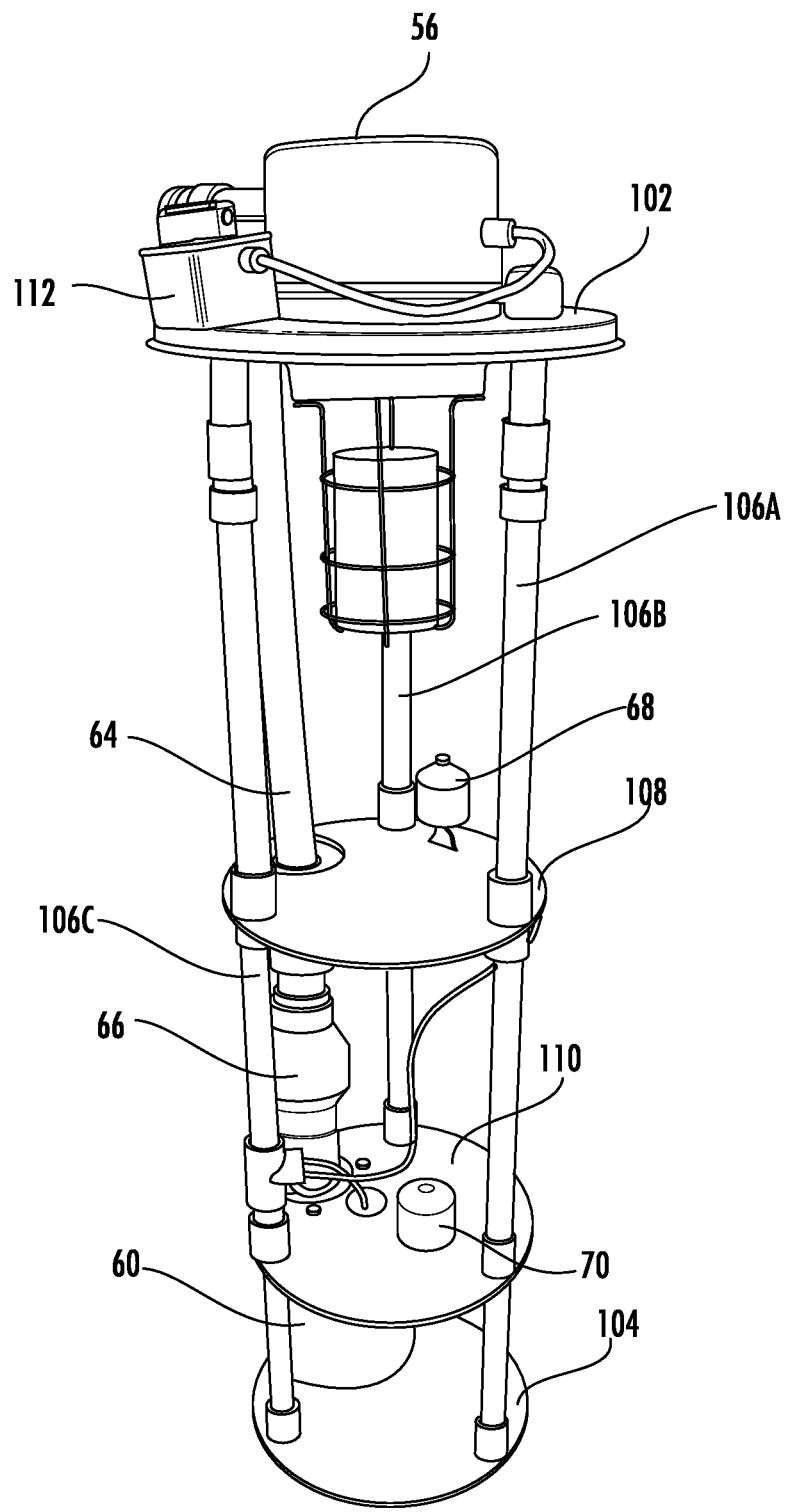
FIGS. 6A and 6B are perspective views of the exemplary supply and collection assembly of FIGS. 3-5 with the outer casing removed to shown internal details.
Figure 6B:
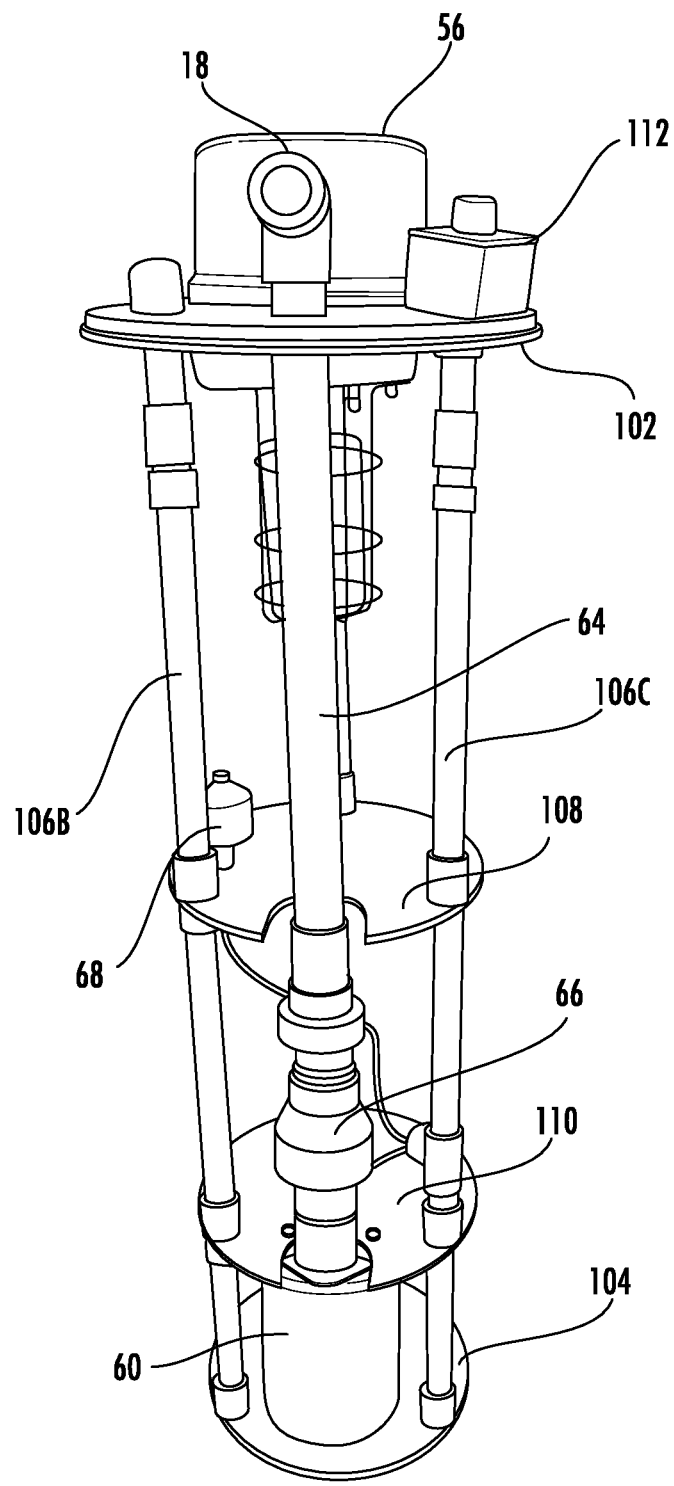

In FIGS. 6A and 6B, the outer casing of housing 50 is removed to show the internal structure thereof. Preferably, the outer casing may be formed as a cylindrical structure that can be removed by simply sliding it up and away from the internal structure (after removal or loosening of various fasteners used to secure housing 50 together). As shown, the internal structure of housing 50 includes a top plate 102 and a bottom plate 104 separated by a plurality of support columns. In this case, three such support columns 106A-C are spaced apart around the circumference of plates 102 and 104. At least column 106C may be hollow to serve as a conduit for electrical wiring to the various internal components.

As shown, vacuum source 56 is mounted above plate 102 so as to be outside of the interior space of housing 50. Pump 60 is mounted inside the interior space of housing 50 on bottom plate 104. In addition, intermediate baffle plates 108 and 110 are provided at upper and lower positions between plates 102 and 104. Plate 108 provides a mount for float switch 68, whereas plate 110 provides a mount for float switch 70. FIGS. 6A and 6B also show piping 64 for cleaning solution exiting the pump, and in-line check valve 66.

Referring specifically to FIG. 6B, an electrical distribution box 112 is located on the upper surface of plate 102. Box 112 mates with a quick connector to provide electrical connection between the circuitry of panel box 94 and the internal components of housing 50 that require electrical connection. As a result, all of these connections can be severed at the same time by simply separating one connector from box 112. This facilitates maintenance and repair of main assembly 16, and also provides a way (in addition to emergency stop button 100) to cease operation of the apparatus quickly should it be deemed necessary by the operator.

Figure 7:
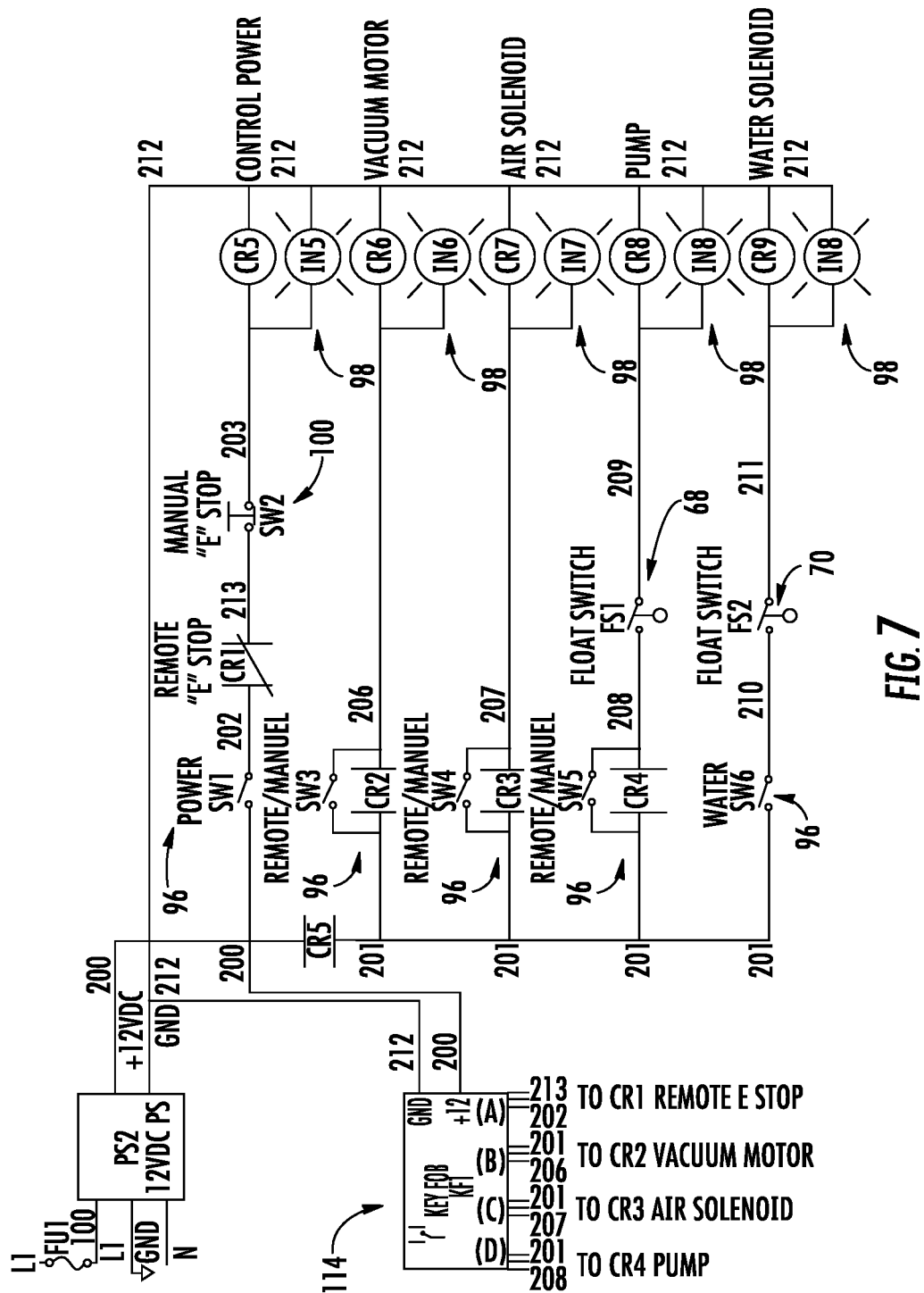
FIGS. 7-8 are wiring schematics of control circuitry for the exemplary supply and collection assembly of FIGS. 3-5.
Figure 8:
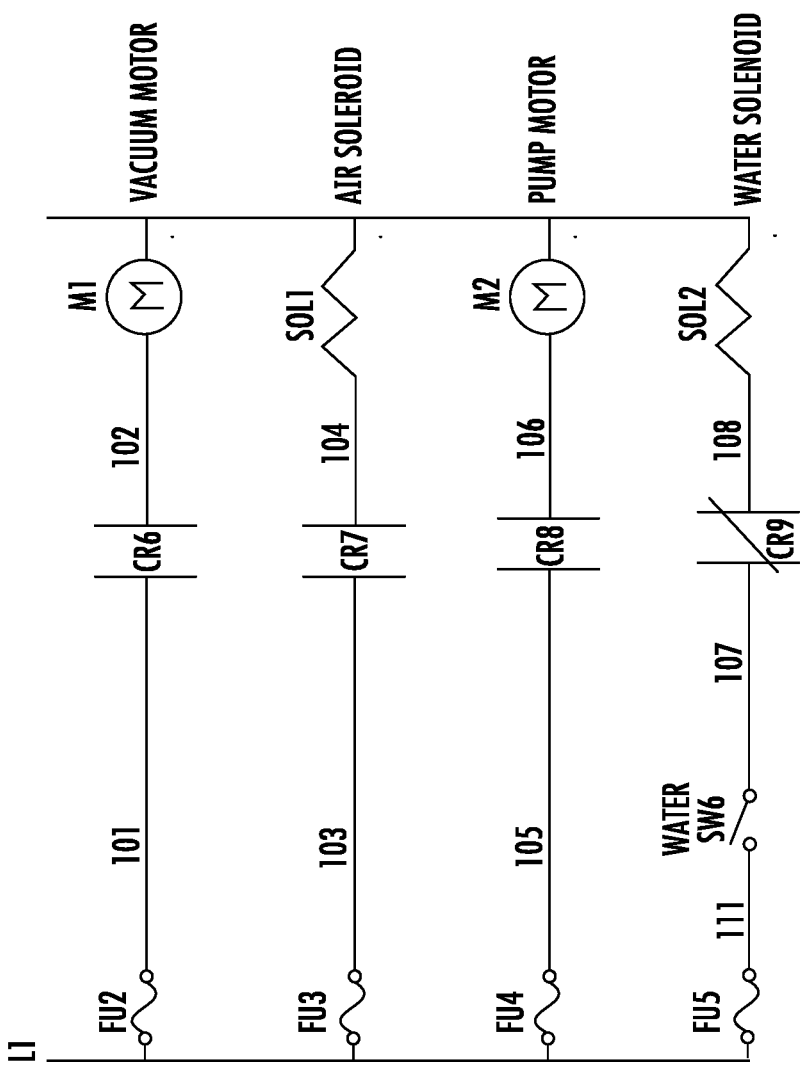
Figure 9:
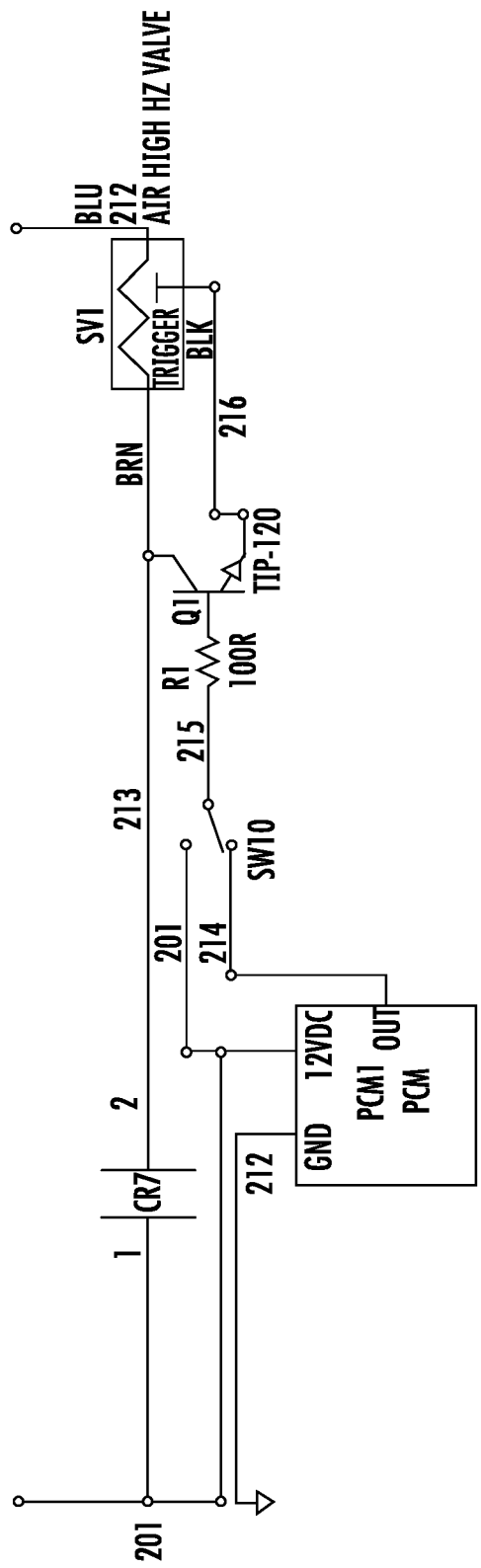
FIG. 9 shows a pulse control module (PCM) and related circuitry for the compressed air pulsation valve.

Various aspects of the control circuitry of main assembly 16, much of which is contained in panel box 94, is shown in FIGS. 7-9. In particular, FIG. 7 shows the interrelationship between the switches 96, lights 98, and emergency stop button 100. As shown, each of switches 96 is in circuit with a respective relay coil (designated CR5-CR9), with the contacts for relays CR6-CR9 being shown in FIG. 8. A key fob control circuit 114 activates other relay coils (designated CR1-CR4), the contacts for which are shown in FIG. 7. FIG. 9 shows an additional circuit which may be provided to cause pulsation of the solenoid of air supply valve 36 as discussed above.

Figure 10:
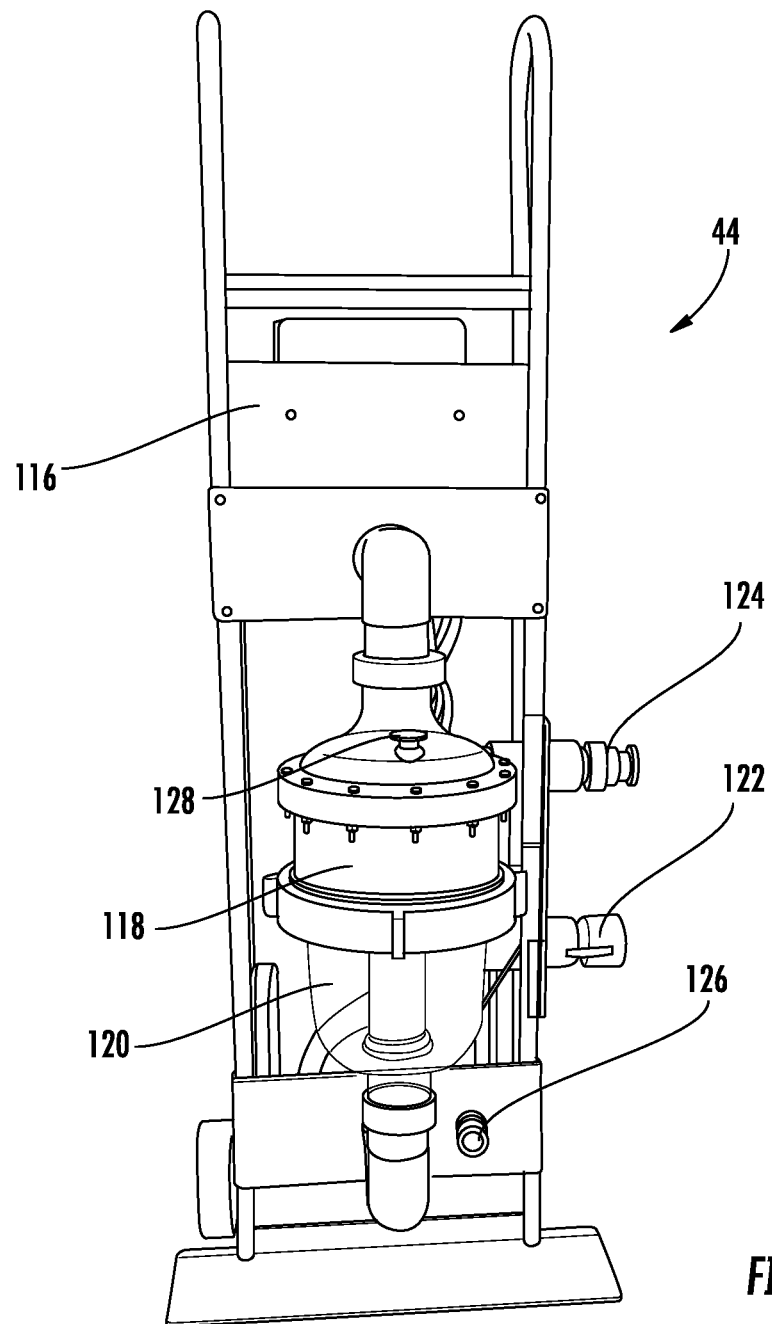
FIGS. 10-11 are perspective views of an exemplary cyclonic filter assembly in accordance with an embodiment of the present invention.
Figure 11:
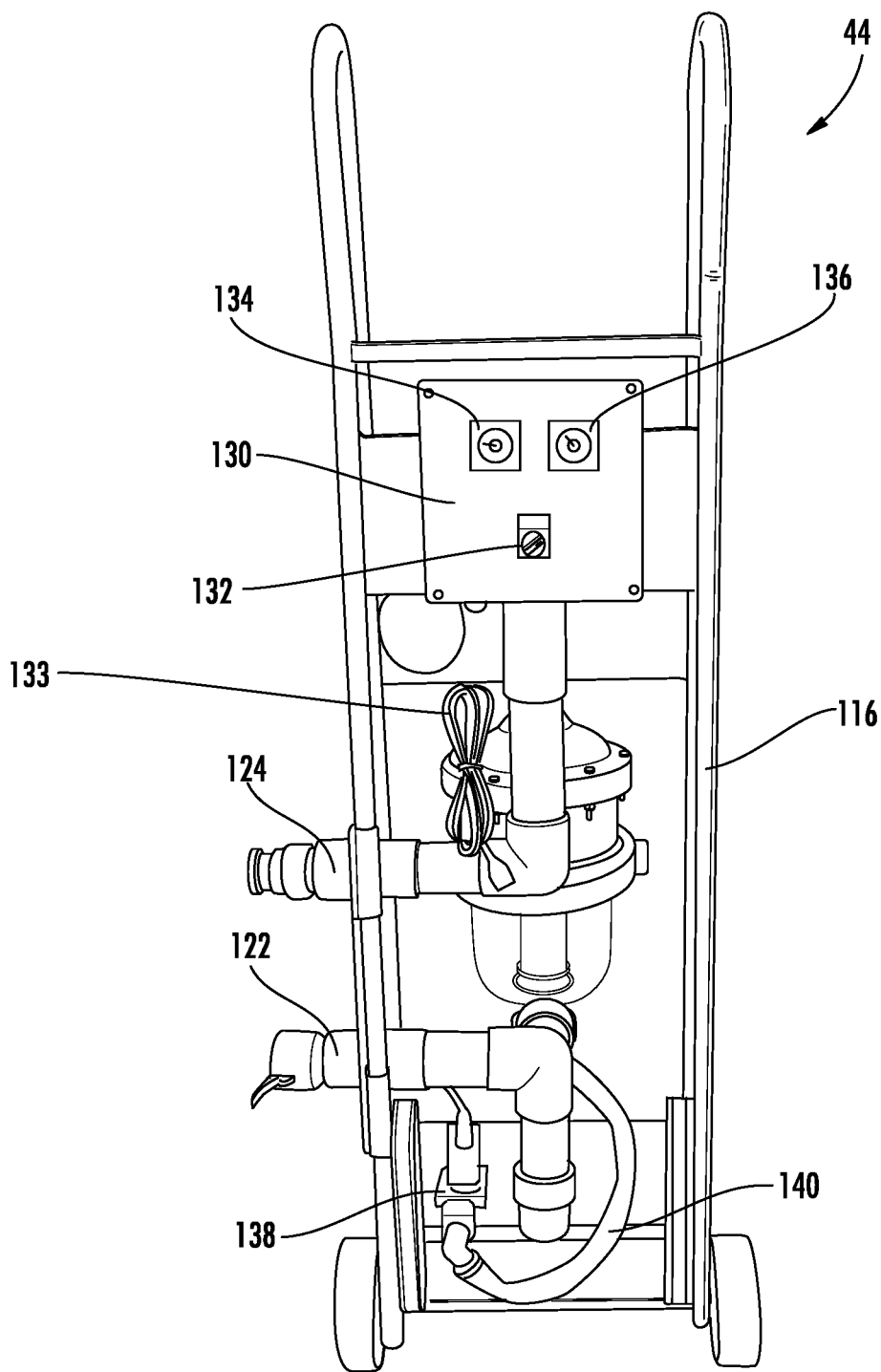

Referring now to FIGS. 10 and 11, a preferred embodiment of filter assembly 44 is illustrated. Like main assembly 16, filter assembly 44 can be conveniently mounted on a hand truck 116 or a similar movable structure to permit it to be easily moved from place to place. As shown, filter assembly 44 in this embodiment includes a hydrocyclonic filter 118 having a container (or "bowl") 120 into which the particulate collects. Such filters are often used in swimming pool filtration systems, but have been found to be especially useful in this application as well. Dirty solution from drain pan 14 enters filter 118 through inlet 122 which is fluid communication with hose 42. After passing through filter 118, the solution exits via outlet 124. As shown in FIG. 10, a filter flush port 126 is provided to allow the contents of container 120 to be emptied as coil cleaning is in process. In addition, filter 118 includes an air bleed port (indicated at 128).

Figure 12:
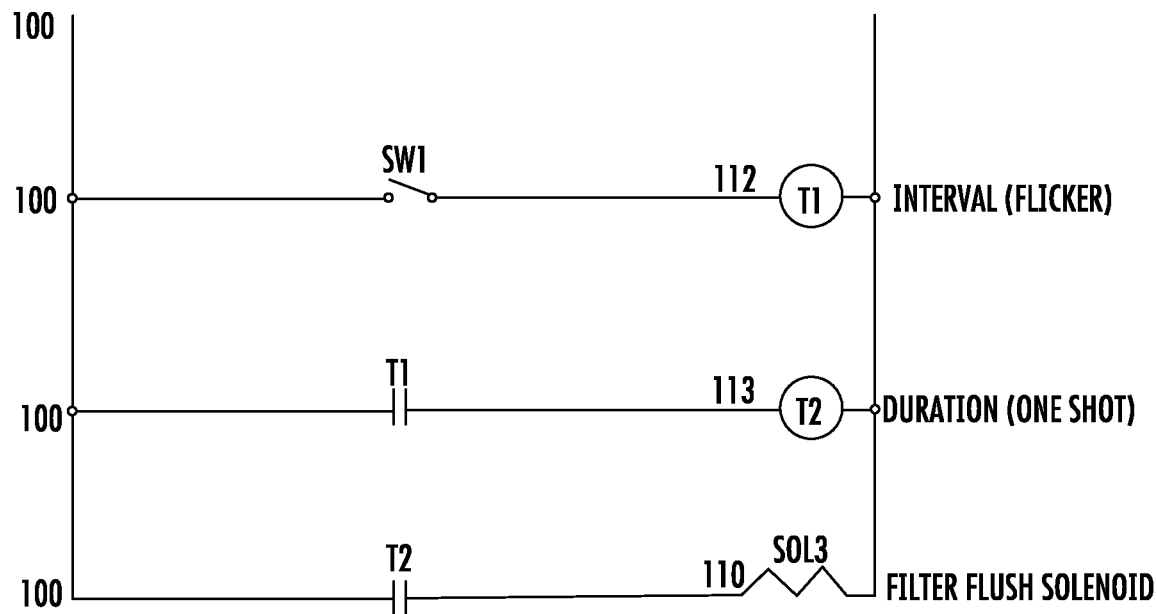
FIG. 12 is a wiring schematic of control circuitry for the exemplary cyclonic filter assembly of FIGS. 10-11.

Referring now particularly to FIG. 11, a panel box 130 may be mounted to the back of hand truck 116 for circuitry used to control the flushing operation. A power switch 132 connects power (supplied by a cord 133) to the circuit components, including an interval timer 134 and a duration timer 136. Interval timer 134 is settable by the operator to determine how frequently the flushing operation occurs. Duration timer 136, also settable by the operator, determines how long the flushing operation lasts for each occurrence. For example, the flushing operation may be set to occur once every five minutes for 22 seconds each time. During flushing, an electrically-controlled valve 138 (which may be ball valve driven by a solenoid) opens to allow the collected particulate to flow out of container 120 through a hose 140 and out port 126. As a result, filter 118 can continue to collect particulate matter from the used cleaning solution without the need to stop the cleaning process. A suitable arrangement for the flushing control circuitry is shown in FIG. 12.

Figure 13:
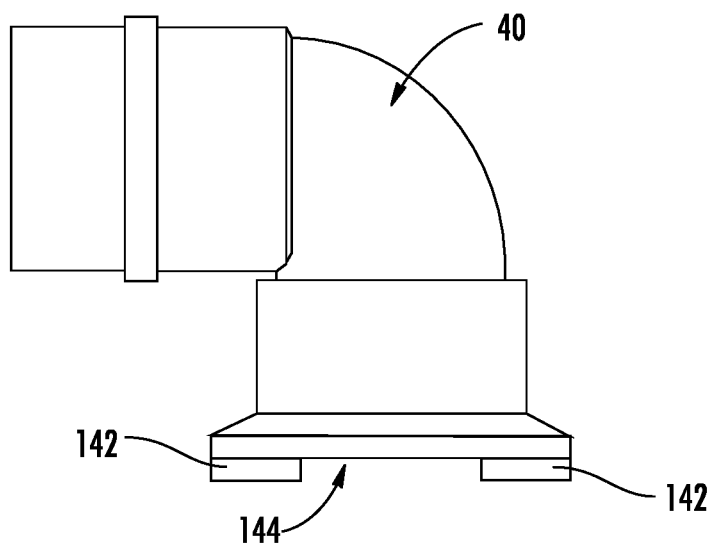
FIG. 13 is an elevational view of an exemplary fluid return tool that may be used with embodiments of the present invention.

FIG. 13 shows an exemplary embodiment of fluid return tool 40. As noted above, tool 40 takes the form of a suction nozzle into which cleaning solution is drawn at drain pan 14 after passing though filter media 48. In this embodiment, a plurality of magnets 142 are provided on the end face of tool 40 to secure it to the bottom of drain pan 14. Sufficient space 144 is provided between the magnets 142 so that they do not substantially interfere with the ingress of cleaning solution.

Figure 14:
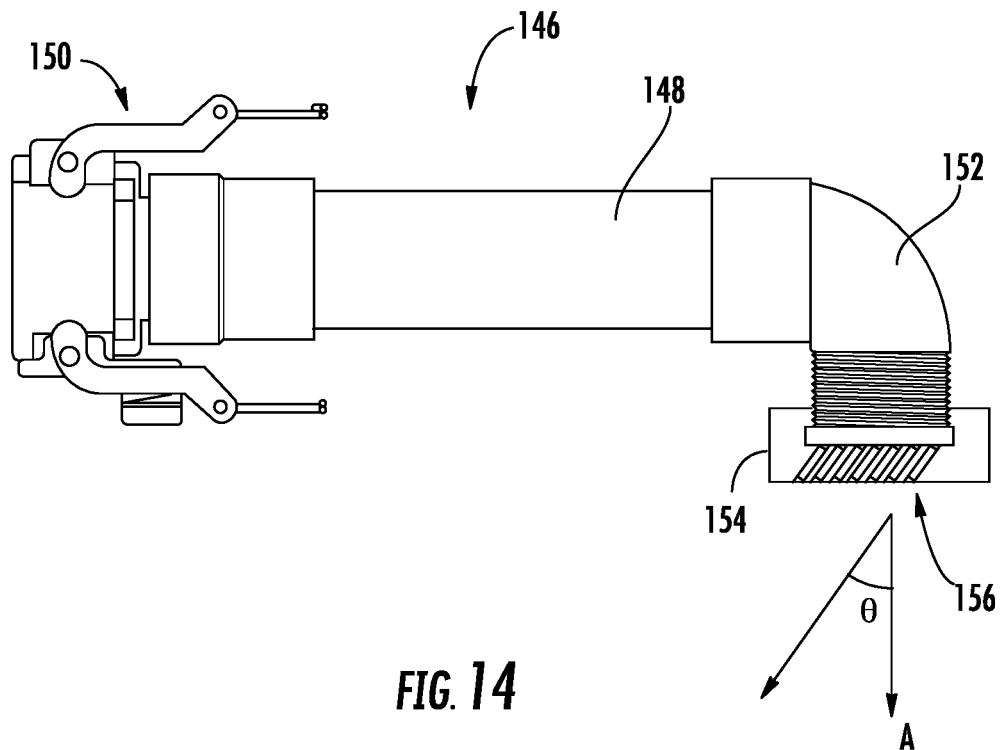
FIG. 14 is a partially diagrammatic elevational view of an exemplary fluid delivery nozzle that may be used with embodiments of the present invention.

Referring now to FIG. 14, an exemplary nozzle device 146 is illustrated that may be used in place of nozzle device 26 of FIG. 1. Nozzle device 146 includes a main conduit portion 148 having a suitable attachment mechanism 150 at its proximal end. In this embodiment, the attachment mechanism 150 comprises a cam and groove hose coupling allowing easy connection to and disconnection from hose 30. One skilled in the art will appreciate, however, that any suitable attachment mechanism may be utilized in accordance with the teachings of the present invention. In this embodiment, an elbow member 152 carrying a solution delivery face 154 is located at the distal end of main conduit portion 148. (Delivery face 154 is shown diagrammatically in FIG. 14 to better illustrate its structure.)

Figure 14A:
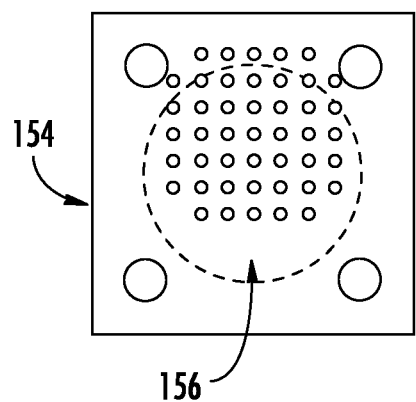
FIGS. 14A and 14B show front side and back side views, respectively, of an exemplary face plate of the fluid delivery nozzle of FIG. 14.
Figure 14B:
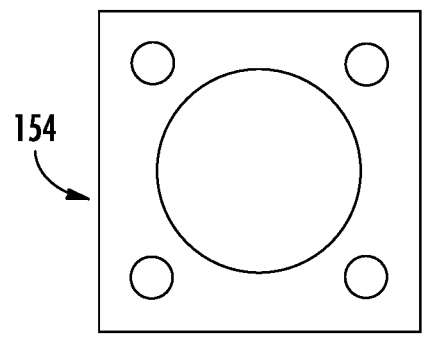

Referring now also to FIGS. 14A and 14B, it can be seen that delivery face 154 defines a plurality of apertures (collectively 156) which extend from one side to the other. In this case, the apertures are arranged in a grid pattern of rows and columns (e.g., seven rows and seven columns). Notably, the apertures are not parallel to the flow axis A of elbow member 152, but diverge from axis A by an angle $\theta$ (FIG. 14). Angle $\theta$ may often fall in a range of approximately 37 to 45 degrees (e.g., approximately 37 degrees in a preferred embodiment). As can be seen, the complement to angle $\theta$ is the angle between the direction of the apertures and the plane of the delivery face 154. Thus, if angle $\theta$ falls within a range of 37 to 45 degrees, the complement will fall in a range of 53 to 45 degrees. When the outer surface of delivery face 154 is flat against the surface of coil unit 12, the cleaning solution will be delivered into the fin structure so as to impinge the fins at a desired angle of attack. This maximizes both removal of material from the fin's surfaces and penetration of the cleaning solution deep into the fin structure but without damaging the fins (which can be fragile).

Figure 15:
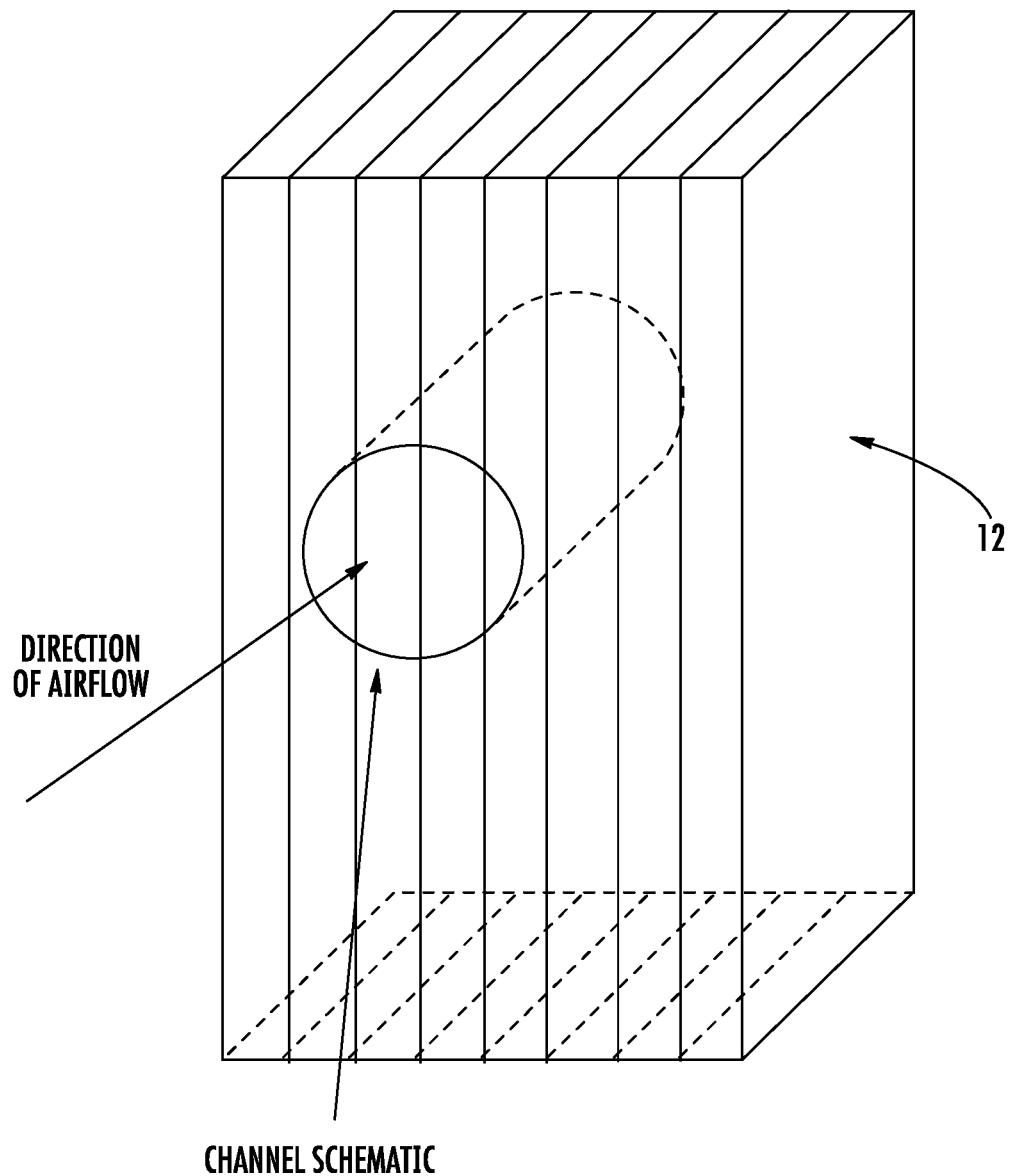
FIG. 15 is a diagram showing channel isolation in accordance with exemplary methodology of the present invention.

In an alternative embodiment, the process may be enhanced by blocking off sections of the coil and cleaning as individual smaller sections. Referring now to FIG. 15, both sides of a channel in the coil (air entering & air leaving) may be temporarily sealed off with tape, plastic, Styrofoam insulation or other method as needed. This advantageously creates an unobstructed and isolated channel between opposite faces of the coil.

In ordinary use, the unit is designed to allow air flow from front to back through multiple channels in the coil. Channels are formed by two adjacent coil fins that run from the front of the coil to the back. Once the appropriate areas have been blocked off (creating the front and back ends of the channel), suction may be applied at a rate of roughly 50-100 inches water column to the front of the channel. In the same location on the back of the coil, which is the opposite end of the channel, cleaning solution is injected using the nozzle (and optionally a deflector shield) as previously described. The injected cleaning solution, supplied with compressed air, simultaneously combined with the vacuum suction on the opposite end of the channel, will remove most, if not all, of the remaining contamination.

It can thus be seen that the present invention provides a novel apparatus and method for cleaning HVAC coils. While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention.

What is claimed is:
1. An apparatus for cleaning an HVAC coil unit, said apparatus comprising a supply and collection assembly having:
  a housing defining an interior space for containing a quantity of cleaning solution;
  a pump having an inlet positioned to be in fluid communication with the cleaning solution, said pump being operative to deliver the cleaning solution to an outlet of said supply and collection assembly in a volume of at least 40 gallons per minute (GPM);

fluid return piping defining a conduit to conduct used cleaning solution from the HVAC coil unit back to a collection inlet;

a filter assembly positioned along the fluid return piping to filter the used cleaning solution; and a fluid flow source operative to provide pressure to move a quantity of the used cleaning solution through the fluid return piping; and the used cleaning solution being returned to the interior space through the collection inlet during operation of said fluid flow source.

2. An apparatus as set forth in claim 1, wherein said fluid flow source creates negative pressure in an ullage space of the housing during operation.

3. An apparatus as set forth in claim 1, further comprising:
a nozzle device in fluid communication with said supply outlet via outlet piping, said nozzle device configured to deliver the cleaning solution to a surface of the HVAC coil unit;
a fluid return tool in fluid communication with said collection inlet via the return piping, said fluid return tool configured to collect the used cleaning solution from the HVAC coil unit.

4. An apparatus as set forth in claim 1, wherein said filter assembly comprises a hydrocyclonic filter.

5. An apparatus as set forth in claim 4, further comprising:
an electrically-controlled flush valve in fluid communication with a collection container of said hydrocyclonic filter; and
control circuitry operative to open and close the flush valve so as to empty the collection container.

6. An apparatus as set forth in claim 1, further comprising air supply piping configured to introduce compressed air into the cleaning solution being delivered from the supply outlet.

7. An apparatus as set forth in claim 6, further comprising an electrically controlled valve in said air supply piping, said valve operative to pulsate introduction of the air into the cleaning solution at a predetermined frequency.

8. An apparatus as set forth in claim 1, further comprising upper and lower level switches in said interior space of said housing.

9. An apparatus as set forth in claim 8, wherein said upper level switch is operative to cut off power to the pump if a threshold upper level of the cleaning solution is reached.

10. An apparatus as set forth in claim 8, wherein said lower level switch is operative to open a fresh water supply port if a threshold lower level of the cleaning solution is reached.

11. An apparatus as set forth in claim 1, wherein said pump is located entirely within said housing of said supply and collection assembly.

12. An apparatus as set forth in claim 11, wherein said fluid flow source comprises a motor located external to said housing of said supply and collection assembly.

13. An apparatus for cleaning HVAC cooling coils, said apparatus comprising:
a supply and collection assembly having:
a housing defining an interior space for containing a quantity of cleaning solution;
a pump operative to deliver the cleaning solution to a supply outlet of said supply and collection assembly in a volume of at least 40 gallons per minute;
a fluid flow source operative to move a quantity of used cleaning solution through return piping to a collection inlet;
a nozzle device in fluid communication with said supply outlet via outlet piping, said nozzle device configured to deliver the cleaning solution to a surface of an HVAC coil unit;
a fluid return tool in fluid communication with said collection inlet via return piping, said fluid return tool configured to collect the used cleaning solution from the HVAC coil unit; and
a filter assembly in line with said return piping between the fluid return tool and the collection inlet.

14. An apparatus as set forth in claim 13, wherein said fluid flow source creates negative pressure in an ullage space during operation to return the used cleaning solution through a collection inlet.

15. An apparatus as set forth in claim 13, wherein said filter assembly comprises a hydrocyclonic filter.

16. An apparatus as set forth in claim 13, further comprising air supply piping configured to introduce compressed air into the cleaning solution being delivered from the supply outlet.

17. An apparatus as set forth in claim 16, further comprising a mechanism operative to pulsate introduction of the air into the cleaning solution at a predetermined frequency.

18. An apparatus as set forth in claim 17, wherein said predetermined frequency is less than approximately 36 Hz.

19. An apparatus as set forth in claim 13, wherein said nozzle device comprises a delivery face having a substantially planar surface for juxtaposition on the surface of the HVAC coil unit, a plurality of apertures being defined in said delivery face for passage of the cleaning solution.

20. An apparatus as set forth in claim 19, wherein said apertures are oriented at a predetermined angle relative to the substantially planar surface of the delivery face.

21. An apparatus as set forth in claim 20, wherein said predetermined angle falls within a range of approximately 45 degrees to approximately 53 degrees.

* * * * *